United States Patent

Sasaki et al.

[15] 3,644,673

[45] Feb. 22, 1972

[54] PCM TRANSMISSION SYSTEM UTILIZING TWO LINEAR DECODERS

[72] Inventors: Shunroku Sasaki, Yokohama-shi; Shizuo Takebayashi, Kawasaki-shi, both of Japan

[73] Assignee: Fujitsu Limited, Kawasaki, Japan

[22] Filed: Aug. 8, 1969

[21] Appl. No.: 848,655

[30] Foreign Application Priority Data

Aug. 13, 1968 Japan....................................43/57755

[52] U.S. Cl...........................178/88, 325/38 A, 179/15 AV, 333/14, 329/109

[51] Int. Cl........................................................H041 15/24

[58] Field of Search...................179/15 AV; 325/38 B, 38 A, 325/38; 333/14; 329/109; 178/88

[56] References Cited

UNITED STATES PATENTS

| | | | |
|---|---|---|---|
| 3,016,528 | 1/1962 | Villars | 179/15 AV |
| 3,180,939 | 4/1965 | Hall | 179/15 AV |
| 3,207,986 | 9/1965 | Bailey | 179/15 AV |

*Primary Examiner*—Robert L. Griffin
*Assistant Examiner*—Albert J. Mayer
*Attorney*—Curt M. Avery, Arthur E. Wilfond, Herbert L. Lerner and Daniel J. Tick

[57] ABSTRACT

A dynamic range of decoding PAM signals is divided into a plurality of ranges by decoding the range of the plurality of ranges which is required to have the highest precision with a number of bits less than the number of bits of PCM input signals to provide an output signal. Bias voltage is applied to the output signal to decode the other ranges of the plurality of ranges.

1 Claims, 5 Drawing Figures

PCM TRANSMISSION SYSTEM UTILIZING TWO LINEAR DECODERS

DESCRIPTION OF THE INVENTION

The present invention relates to a PCM decoding system. More particularly, the invention relates to a decoding system for a PCM transmission system utilizing digital amplitude companding.

A digital companding type coding transmission system of the present invention is a system wherein, at the transmitter, PAM signals are linearly coded into bits of a number larger than the number of the bits to be transmitted. These bits are converted by means of code conversion into bits having the required compression characteristic to be transmitted, and said bits are transmitted. At the receiver, the signals produced by the code conversion are reconverted back to the original linearly coded signals, although accurate reconversion is impossible because a small number of bits are converted into a large number of bits. The signals produced by the reconversion are decoded by a linear decoder.

The digital companding coding transmission system is superior to the analog companding system, which system utilizes a diode compander for reproducing companding characteristics, and is also superior to a nonlinear coder, since the companding characteristics may be more freely selected.

In the known digital companding coding transmission system, however, in accordance with the increase of the coding bits, the precision of the weighting resistance utilized in the decoder becomes very exact. For example, the relation between the resistance precision $r$ and the quantization error $\Delta$ of a decoding circuit utilizing a ladder-type circuit may be expressed as:

$$\Delta = \tfrac{3}{8}\, r \text{ times } 2^n \qquad (1)$$

wherein $2^n$ is the number of quantization levels.

As seen from Equation (1), in a decoding circuit of 12 bits, $r$ becomes equal to 0.007 percent when an error of 1/10 step is allowed. It is almost impossible to achieve such a value with existing manufacturing techniques. The highest value now attainable is $r$=0.02 percent.

The principal object of the present invention is to provide a new and improved decoding system for a PCM transmission system utilizing amplitude companding.

An object of the present invention is to provide a new and improved method of decoding in a PCM transmission system utilizing amplitude companding.

An object of the present invention is to provide a decoding system for a PCM transmission system which overcomes the disadvantages of known types of digital companding coding transmission systems.

An object of the present invention is to provide a decoding system for a PCM transmission system which permits the utilization of a readily attainable resistance precision.

An object of the present invention is to provide a decoding system for a PCM transmission system which functions with high precision, efficiency, effectiveness and reliability.

In accordance with the present invention, a decoding system for a PCM transmission system utilizing amplitude companding comprises an input for decoded PAM signals decoded from PCM input signals having a number of coding bits. The decoded PAM signals have a dynamic range. A decoder connected to the input divides the dynamic range of the decoded PAM signals into a plurality of ranges. The decoder decodes the range of the plurality of ranges which is required to have the highest precision with a number of bits less than the number of coding bits of the PCM input signals. The decoder has an output providing an output signal. An additional decoder connected to the output of the decoder applies bias voltage to the output signal of the decoder thereby decoding the other ranges of the plurality of ranges. The bias voltage corresponds to the other ranges. An output connected to the additional decoder provides an output signal.

The decoder linearly decodes the PCM signals of the fourth to twelfth of 12 bits and the additional decoder decodes the first to third of the 12 bits.

In accordance with the present invention, a method of decoding comprises the steps of dividing a dynamic range of decoded PAM signals into a plurality of ranges by decoding the range of the plurality of ranges which is required to have the highest precision with a number of bits less than the number of bits of PCM input signals to provide an output signal, and applying bias voltage to the output signal to decode the other ranges of the plurality of ranges. The PCM signals of the fourth to twelfth of 12 bits are decoded and the PCM signals of the first to third of the 12 bits have a bias voltage applied thereto.

In order that the present invention may be readily carried into effect, it will now be described with reference to the accompanying drawings, wherein.

Figure 1:
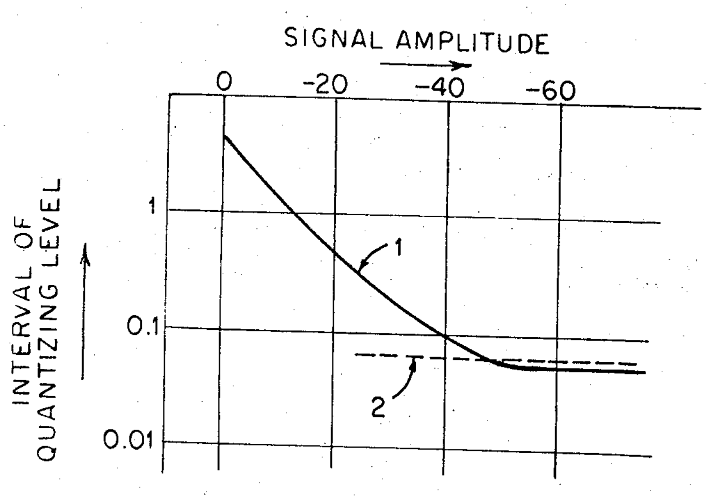
FIG. 1 is a graphical presentation for aiding in explaining the decoding system of the present invention.

FIG. 1 illustrates the relation between the input amplitude, represented by the abscissa, and the quantization interval, represented by the ordinate, in the logarithmic companding coding of eight bits and the linear coding of 12 bits. The abscissa represents the input amplitude in units of decibels. The overload point is 0. The quantization interval, represented by the ordinate, indicates the quantization interval 1 of the linear coding of eight bits.

In FIG. 1, the solid line curve 1 illustrates the logarithmic companding of eight bits and the broken line curve 2 illustrates the linear coding of 12 bits. As evident from FIG. 1, in a digital companding decoder, quantization is performed roughly at a large amplitude and more precisely or finely at a small amplitude. The allowable magnitude of the quantization error $\Delta$ may therefore be small at a small amplitude and large at a large amplitude. This fact is utilized in the decoding system and in the method of decoding of the present invention.

Figure 2:
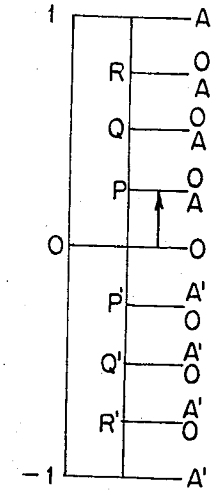
FIG. 2 is a graphical presentation for aiding in explaining the operation of the decoding system of the present invention.

It is assumed that the dynamic range of the signals, as shown in FIG. 2, is −1 ~ +1. The dynamic range is divided into eight ranges 1–R, R–Q, Q–P, P–0, 0–P′, P′–Q′, Q′–R′ and R′—1 by points R, Q, P, P′, Q′ and R′. The magnitudes or values around O may thus be finely coded and the magnitudes of large amplitude may be roughly or coarsely coded.

Of the eight ranges, P–0 or 0–P′ are required to have the highest precision. In the decoding system of the present invention, for example, decoding 12 bits, the range P–0 or 0–P′ is decoded with 10 bits, the range P–Q is decoded by applying a bias voltage at a level A, which is the level of the point P, and the range Q–R is decoded by applying a bias voltage at a level 2A, which is the level of the point Q.

Figure 3:
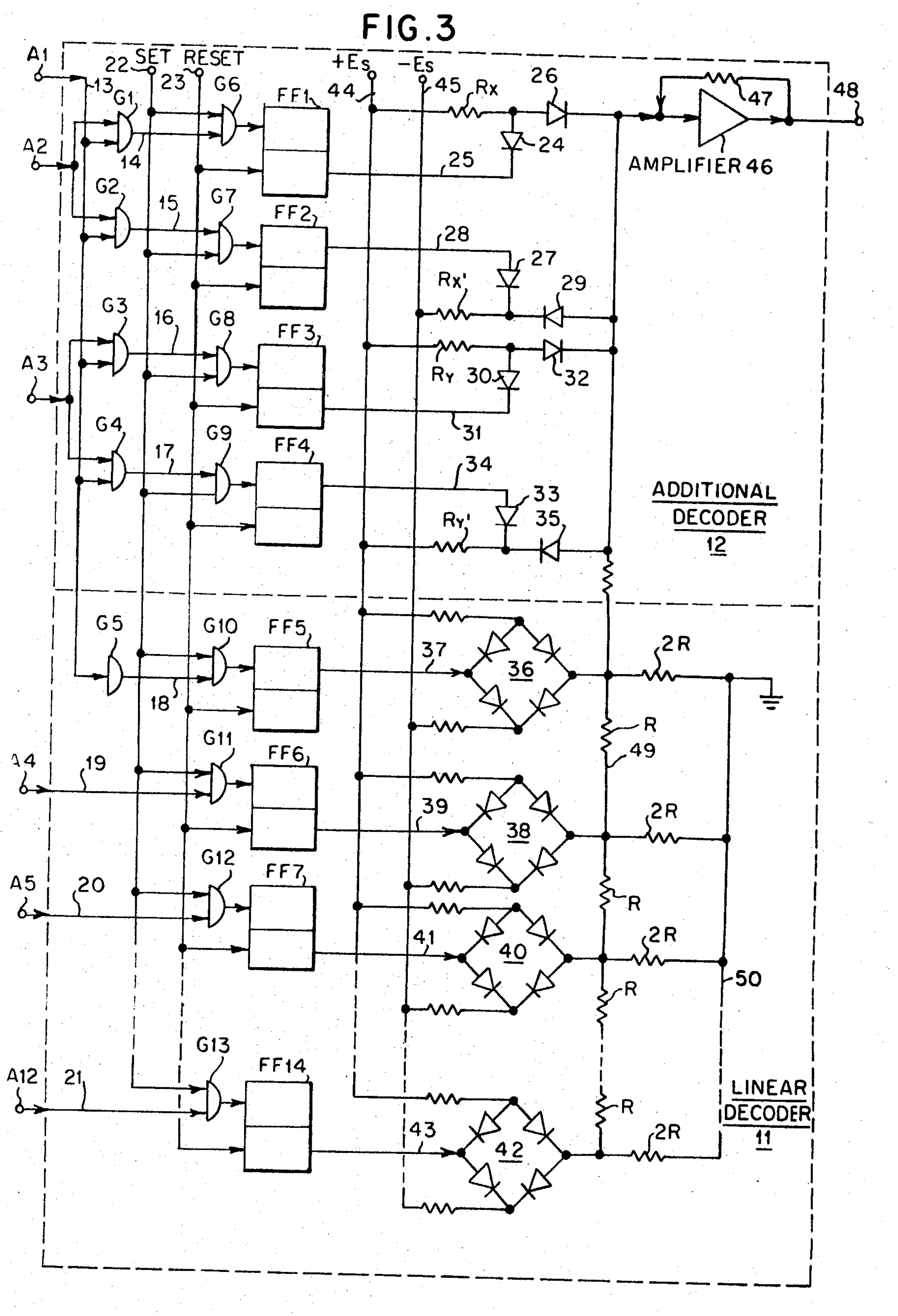
FIG. 3 is a circuit diagram of an embodiment of the decoding system of the present invention.

The decoder of FIG. 3 decodes PCM signals coded into 12 bits and comprises a linear decoder 11, which decodes 10 bits, and an additional decoder 12, which decodes three bits. The additional decoder functions to decode by applying a bias voltage. IN FIG. 3, PCM signals of 12 bits are applied via input terminals A1, A2, A3, A4, A5, A6, A7, A8, A9, A10, A11 and A12. The input terminal A1 is connected to one input of each of a plurality of AND-gates G1, G2, G3 and G4, and to the signal input of an AND-gate G5 via a lead 13.

The input terminal A2 is connected to the second input of each of the AND-gates G1 and G2. The input terminal A3 is connected to the second input of each of the AND-gates G3 and G4. The output of the AND-gate G1 is connected to a first input of an AND-gate G6 via a lead 14. The output of an AND-gate G2 is connected to a first input of an AND-gate G7 via a lead 15. The output of the AND-gate G3 is connected to a fist input of an AND-gate G8 via a lead 16. The output of the AND-gate G4 is connected to a first input of an AND-gate G9 via a lead 17. The output of the AND-gate G5 is connected to a first input of an AND-gate G10 via a lead 18. The input terminal A4 is connected to a first input of an AND-gate G11 via a lead 19. The input terminal A5 is connected to a first input of an AND-gate G12 via a lead 20, and so on, and the input terminal A12 is connected to a first input of an AND-gate G13 via a lead 21.

A set input terminal 22 is connected to the second input of each of the AND-gates G6 to G12, and so on, and the AND-gate G13. The output of the AND-gate G6 is connected to the set input of a flip-flop FF1. The output of the AND-gate G7 is connected to the set input of a flip-flop FF2. The output of the AND-gate G8 is connected to the set input of a flip-flop FF3. The output of the AND-gate G9 is connected to the set input of a flip-flop FF4. The output of the AND-gate G10 is connected to the set input of a flip-flop FF5. The output of the AND-gate G11 is connected to the set input of a flip-flop FF6. The output of the AND-gate G12 is connected to the set input of a flip-flop FF7, and so on, and the output of the AND-gate G13 is connected to the set input of a flip-flop FF14.

A reset input terminal 23 is connected to the reset input of each of the flip flops FF1 to FF14. The reset output of the flip-flop FF1 is coupled, via a diode 24 and a lead 25, to a common point in the connection between a bias resistor Rx and a diode 26 connected in series circuit arrangement with each other. The set output of the flip-flop FF2 is coupled, via a diode 27 and lead 28, to a common point in the connection between a bias resistor Rx′ and a diode 29 connected in series circuit arrangement with each other.

The reset output of the flip-flop FF3 is coupled, via a diode 30 and a lead 31, to a common point in the connection between a bias resistor Ry and a diode 32 connected in series circuit arrangement with each other. The set output of the flip-flop FF4 is coupled, via a diode 33 and a lead 34, to a common point in the connection between a bias resistor Ry′ and a diode 35 connected in series circuit arrangement with each other.

The set output of the flip-flop FF5 is connected to a terminal of a full-wave rectifier 36 via a lead 37. The reset output of the flip-flop FF6 is connected to a terminal of a full wave rectifier 38 via a lead 39. The reset output of the flip-flop FF7 is connected to a terminal of a full-wave rectifier 40 via a lead 41, and so on, and the reset output of the flip-flop FF14 is connected to a terminal of a full-wave rectifier 42 via a lead 43.

A positive bias +Es is applied to bias resistor end of each of the series circuit arrangements Rx, 26 and Ry, 32 and to a terminal of each of the full-wave rectifiers 36, 38, 40, and so on, via a corresponding resistor, and a common lead 44. A negative bias voltage −Es is applied to the bias resistor end of each of the series circuit arrangements Rx′, 29 and Ry′, 35, and to another terminal of each of the full-wave rectifiers 36, 38, 40, and so on, via a corresponding resistor, and a common lead 45.

The diode end of each of the series circuit arrangements Rx, 26, and Rx′, 29 and Ry, 32 and Ry′, 35 is connected in common with the others to the input of an amplifier 46. The amplifier has a feedback circuit including a feedback resistor 47. An output terminal 48 is provided at the output of the amplifier 46 and constitutes the output terminal of the circuit of FIG. 3.

The remaining terminal of each of the full-wave rectifiers 36, 38, 40, and so on, is connected in common to a lead 49 which constitutes the lead connecting the outputs of the series circuit arrangements to the input of the amplifier 46. Each of the full-wave rectifiers is separated from the next-adjacent one by a weighting resistor R. The remaining terminal of each of the full-wave rectifiers 36, 38, 40, and so on, is also connected in common to a ground lead 50 via a weighting resistor 2R.

The linear decoder 11 is thus seen to utilize the weighting resistors R and 2R as in a well-known ladder-type circuit. PCM signals of the first bit A1 and the fourth to twelfth bits A4 to A12 are supplied to the linear decoder 11. The linear decoder 11 provides decoding of 10 bits. Analog signals of ranges P–P′ of FIG. 2 may thus be provided at the output of the linear decoder.

In FIG. 3, the additional decoder 12 is a logical circuit comprising the AND-gates G1 to G4 and the flip-flops FF1 to FF14. The logical circuit of the additional decoder 12 adds the bias to the output signal of the decoder 11 via the bias resistors Rx, Rx′, Ry and Ry′. The bias is applied to the first to third bits A1 to A3 of the input PCM signals. The bias signals are suitably amplified by the amplifier 46 and the decoded signals are provided at the circuit output terminal 48.

Figure 4:
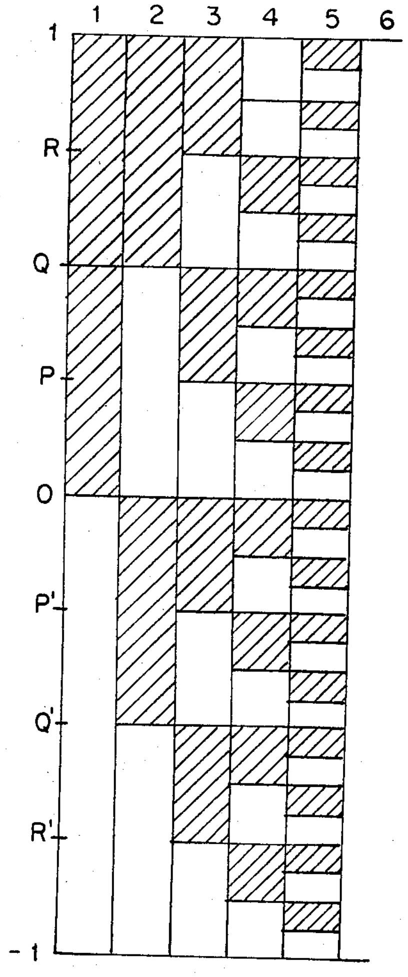
FIG. 4 is a graphical presentation explaining the operation of FIG. 3.

If it is assumed that codes of 12 bits are coded by the normal binary coding method, the code patterns will be as shown in FIG. 4. As is evident from FIG. 4, the ranges 1–R, R–Q, and so on, R′—1 of the signal to be decoded may be determined by determining the signs or polarities of the signals of the first, second and third bits. The first bit indicates the polarity of the PAM signals. In each of the fourth and succeeding bits, all of the dynamic ranges have the same pattern. It may therefore be seen that the signals between P and P′ may be decoded by the decoder 11 of 10 bits without utilization of the second and third bits.

In FIG. 4, hatched areas indicate binary 1 and nonhatched areas indicate binary 0. The allowable error of resistors in the decoder of the present invention, as aforedescribed, is calculated as follows. The allowable error of resistors in a decoding circuit or decoder of 10 bits may be expressed as $r$=0.02 percent from Equation (1), allowing a step error of 1/10. The allowable error of the bias resistors Rx, Rx′, Ry and Ry′ then becomes $4$=0.36 percent. A decoder of sufficiently high precision may thus be made by utilizing resistors manufactured by present techniques.

Figure 5:
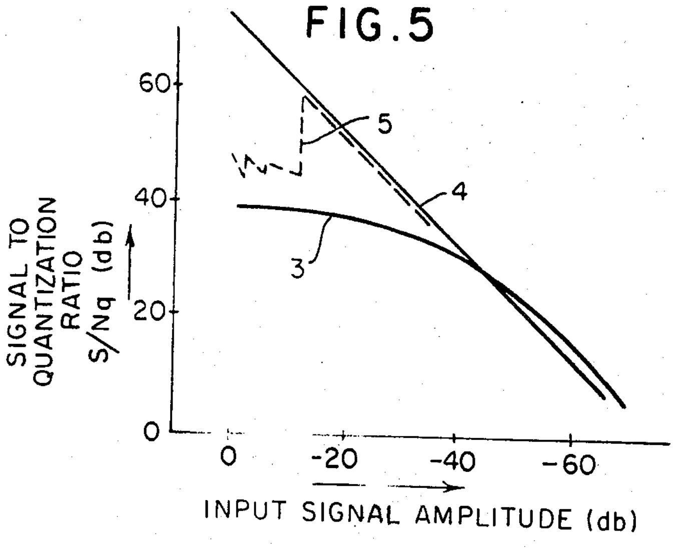
FIG. 5 is a graphical presentation explaining the operation of FIG. 3.

The decoding system of the present invention provides for example, a signal-quantization noise characteristic S/Nq by a nonlinear coding characteristic of eight bits by utilizing a system wherein codes are decoded by a linear decoder of 12 bits and are transmitted via a transmission line in eight bits, so that a signal-quantization noise characteristic by a nonlinear characteristic of eight bits is provided. This is illustrated in FIG. 5. In FIG. 5, the abscissa indicates the input signal amplitude in decibels. The overload is 0. The ordinate indicates the signal-to-quantization ratio S/Nq in decibels.

In FIG. 5, a curve 3 illustrates nonlinear coding of eight bits under conditions in which $\mu$=100. A linear curve 4 of FIG. 5 illustrates linear coding of 12 bits. A broken line curve 5 of FIG. 5 illustrates the operation of the decoding system of the present invention. As shown in FIG. 5, in accordance with the decoding system of the present invention, the ratio S/Nq is slightly lowered compared to the coding of 12 bits in ranges of large amplitude, but the desired characteristic of eight bits may be satisfactorily obtained without the strict precision requirements for the resistors as required in the coding of 12 bits.

Although the present invention has been particularly described with reference to a digital companding decoding system as a preferred embodiment thereof, the invention is not so limited. The present invention may also be applied to a local decoder used in a feedback coder. Although the specific numerical values of 12 bits, 10 bits and eight bits have been utilized in explaining the decoding system of the present invention, the numerical values are not so limited. An example of the system of the invention is as follows: First, the PAM signals are linearly coded into 12 bits. The bits are converted into compressed codes of eight bits and the eight bits are transmitted. At the receiver, the eight bits are reconverted back to 12 bits and the 12 bits are decoded by a linear decoder of 12 bits. Since the linear coding of 12 bits is performed, the dynamic range 1 —1 of the signals shown in FIGS. 2 and 4 may be divided into levels of 4,096. This may be expressed as follows:

| Segment | Levels | Linear Codes | Non-Linear Codes |
|---|---|---|---|
| 1 | 1024 ~ 2047 | 11xyZUABCDEF | 1111xyZU |
| 2 | 512 ~ 1023 | 101xyZUABCDE | 1110xyZU |
| 3 | 256 ~ 511 | 1001xyZUABCD | 1101xyZU |
| 4 | 128 ~ 255 | 10001xyZUABC | 1100xyZU |
| 5 | 64 ~ 127 | 100001xyZUAB | 1011xyZU |

| | | | |
|---|---|---|---|
| 6 | 32 ~ 63 | 1000001xyZUA | 1010xyZU |
| 7 | 16 ~ 31 | 10000001xyZU | 1001xyZU |
| 8 | 0 ~ 15 | 10000000xyZU | 1000xyZU |
| 9 | 0 ~ −15 | 00000000xyZU | 0000xyZU |
| 10 | −16 ~ −31 | 00000001xyZU | 0001xyZU |
| 11 | −32 ~ −63 | 0000001xyZUA | 0010xyZU |
| 12 | −64 ~ −127 | 000001xyZUABC | 0011xyZU |
| 13 | −128 ~ −255 | 00001xyZUABC | 0100xyZU |
| 14 | −256 ~ −511 | 0001xyZUABCD | 0101xyZU |
| 15 | −512 ~ −1023 | 001xyZUABCDE | 0110xyZU |
| 16 | −1024 ~ −2047 | 01xyZUABCDEF | 0111xyZU |

The foregoing table also shows the signal conversion system corresponding to the well-known 13 polygonal lines companding characteristic. In segments 1 ~ 6 and 11 ~ 16, the coding precision is changed each time the segment is changed, whereas the coding precisions of segments 7 ~ 10 are equal and the best in the 16 segments. In this table, each of ABCDEF*xy*ZU becomes 1 or 0 depending on the level of the signal. *x*,*y*,Z,U are effective codes which are regenerated at the receiver and A,B,C,D,E,F are ineffective codes which are not transmitted and are therefore not decoded at the receiver. Thus, segments 7 ~ 10 have the highest precision, since these segments have no ineffective code, and in the following segments, there is a loss in accuracy as the number of the ineffective codes increases. This linear coding may be performed by a well known linear coder of 12 bits. In this method, the first bit shows the polarity of the signal and the following bits are the normal binary codes.

Next, the linear codes of 12 bits are converted into nonlinear codes of eight bits and the nonlinear codes are transmitted. This conversion may be achieved according to the following principles. The first to fourth bits show the segment to which the signals belong. Since there are 16 segments, four bits ($2^4$=16) are required for this purpose. For example, in the first segment, the linear codes are converted into nonlinear codes of "1111" and in the 15th segment, the linear codes are converted into nonlinear codes of "0110." In each segment, the fifth to eighth bits are effective codes, and *x*,*y*,Z and U, obtained by the conversion of the linear codes of 12 bits, are transmitted.

The operation at the receiver is as follows:

| Received Codes | Converted Codes | Decoding |
|---|---|---|
| 1111xyZU | 11xyZU000000 | 1024 ~ 2047(16-nary) |
| 1110xyZU | 101xyZU00000 | 512 ~ 1023(16-nary) |
| 1101xyZU | 1001xyZU0000 | 256 ~ 511(16-nary) |
| 1100xyZU | 10001xyZU000 | 128 ~ 255(16-nary) |
| 1011xyZU | 100001xyZU00 | 64 ~ 127(16-nary) |
| 1010xyZU | 1000001xyZU0 | 32 ~ 63(16-nary) |
| 1001xyZU | 10000001xyZU | 16 ~ 31(16-nary) |
| 1000xyZU | 10000000xyZU | 0 ~ 15(16-nary) |
| 0000xyZU | 00000000xyZU | 0 ~ 15(16-nary) |
| 0001xyZU | 00000001xyZU | −16 ~ −31(16-nary) |
| 0010xyZU | 0000001xyZU0 | −32 ~ −63(16-nary) |
| 0011xyZU | 000001xyZU00 | −64 ~ −127(16-nary) |
| 0100xyZU | 00001xyZU000 | −128 ~ −255(16-nary) |
| 0110xyZU | 001xyZU00000 | −512 ~ 1023(16-nary) |
| 0111xyZU | 01xyZU000000 | −1024 ~ −2047(16-nary) |

At the receiver, the received codes of eight bits are converted into codes of 12 bits according to the conversion principle which is the reverse of that at the transmitter. It should be noted, however, that at the receiver, the smaller number of bits are converted into the larger number of bits, and therefore the informations of codes ACBDEF which exist at the transmitter do not exist at the receiver. Instead of codes ABCDEF, other suitable codes such as 0 (as in the second table) or 1, or combinations of 1 and 0, are inserted. The initial level may be obtained by decoding the converted codes of 12 bits by a well-known linear decoder. AT the receiver, the converted codes are four bits of *xy*ZU in each segment, and therefore only the 16-nary can be achieved. Therefore, in each of the first and 16th segments with the large signal level the level range of 1024 can be decoded only with 16 levels, whereas in each of the 7th to 10th segments with the small signal level the small level may be decoded by the signal transmission of eight bits with the precision of 12-bit coding. Thus, in the digital companding signal transmission system, the nonlinear coding transmission may be performed without utilizing a nonlinear coder and a nonlinear decoder, but by utilizing only a linear decoder.

While the invention has been described by means of a specific example and in a specific embodiment, we do not wish to be limited thereto, for obvious modifications will occur to those skilled in the art without departing from the spirit and scope of the invention.

We claim:

1. A decoding system for a PCM transmission system utilizing amplitude companding, said decoding system comprising input means for decoded PAM signals decoded from PCM input signals having a number of coding bits, said input means having *n* terminals including a first bit input, an $m^{th}$ an $(m+1)^{th}$ bit input and an $n^{th}$ bit input;

means for supplying to the terminals of the input means PCM codes of *n* bits to be decoded in parallel;

first linear decoding means connected to said input means for partial decoding and for dividing the dynamic range of said decoded PAM signals into a plurality of ranges, said first decoding means decoding the range of said plurality of ranges which is required to have the highest precision with a number of bits less than the number of coding bits of the PCM input signals, said first decoding means comprising gate means connected to the first bit input and the $(m+1)$bit input to $n^{th}$ bit input of the input means, flip-flop means connected to the gate means and weighting resistance means connected to the flip-flop means and having output means providing and output signal connected to said weighting resistance means;

additional linear decoding means connected to the first bit input to $m^{th}$ bit input of said first decoding means for producing the bias voltage for the output signal of said first decoding means thereby decoding the other ranges of said plurality of ranges; and output means connected to said additional decoding means for providing an output signal which is a decoded signal of the addition of the bias produced by the additional decoding means to the partially decoded signal provided by the first decoding means.

2. A decoding system as claimed in claim 1, wherein said first decoding means linearly decodes the PCM signals of the fourth to 12th of 12 bits and said additional decoding means decodes the PCM signals of the first to third of said 12 bits.

* * * * *